May 10, 1955   J. D. CRABBE ET AL   2,708,228
APPARATUS FOR THE AUTOMATIC PRODUCTION OF
ENDLESS LOOP OF WIRE FROM WIRE STOCK
Filed Sept. 11, 1952   14 Sheets-Sheet 1
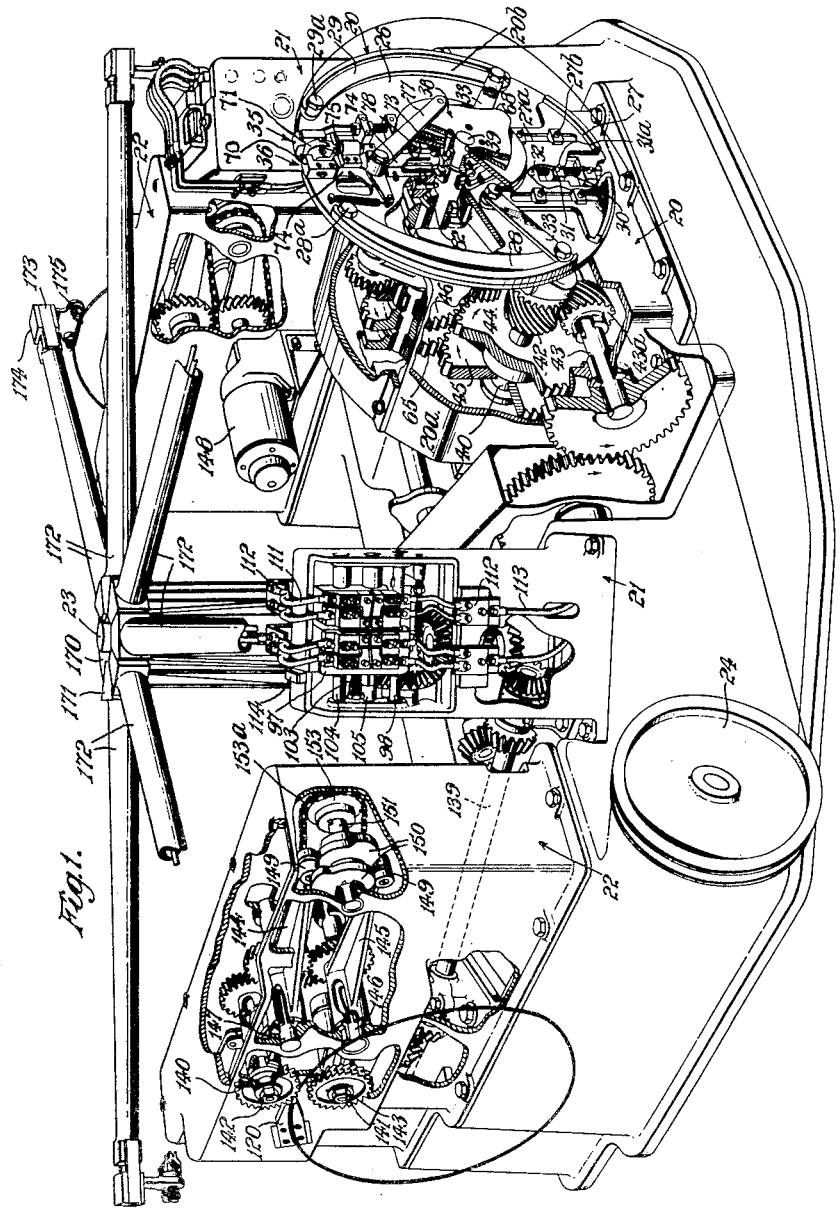

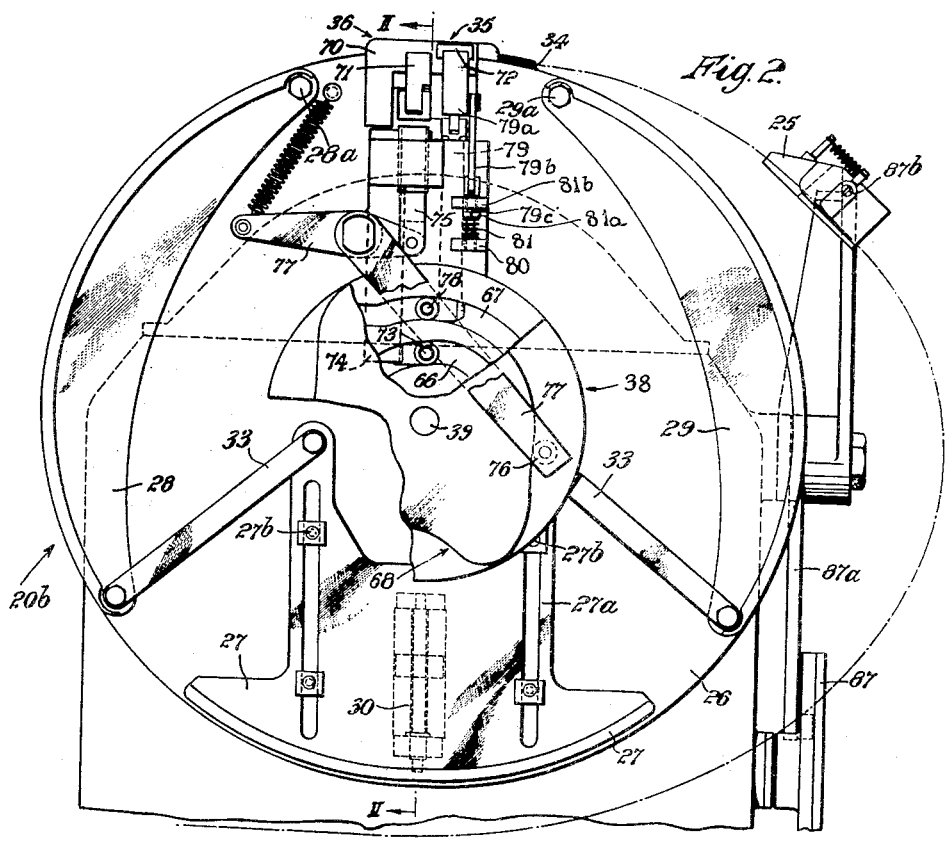

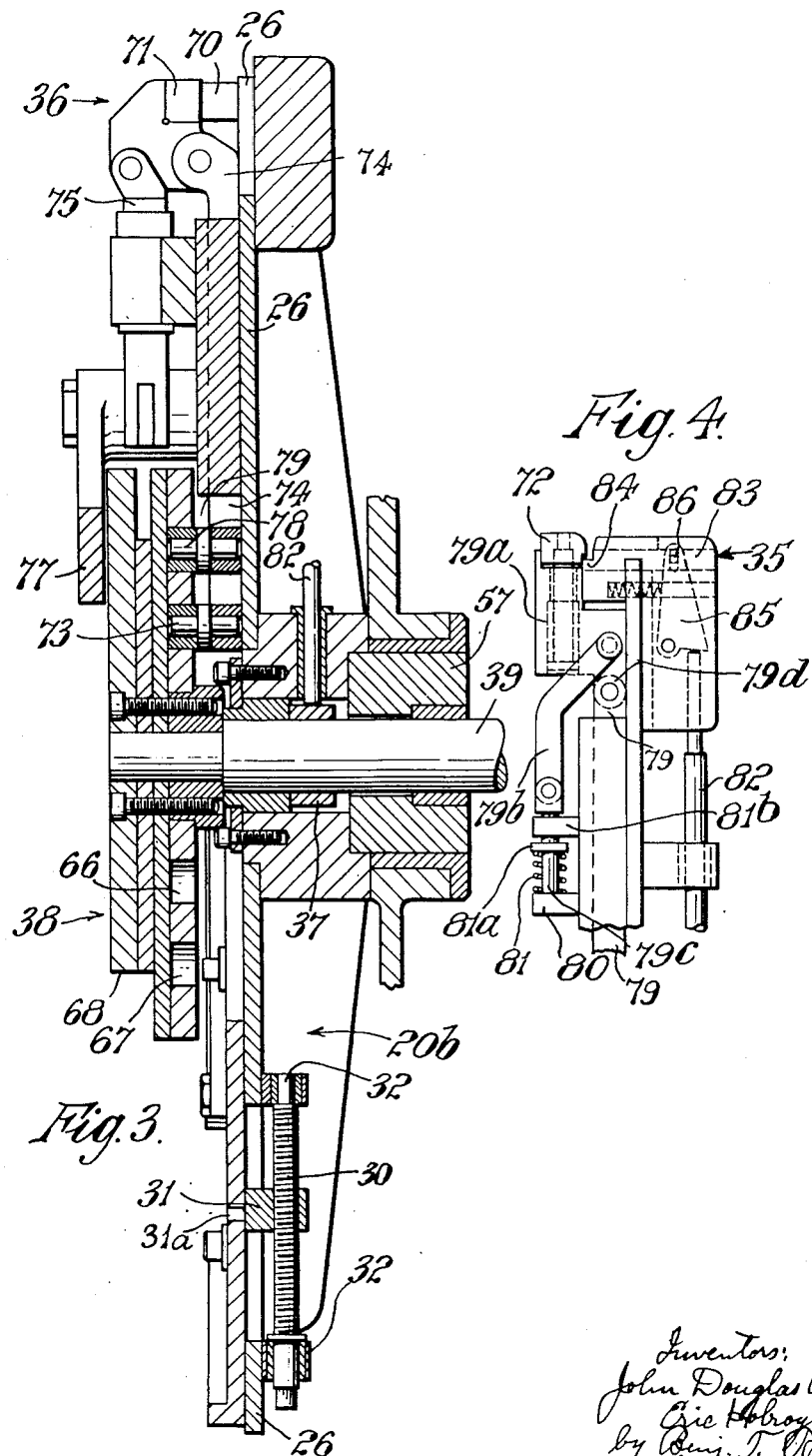

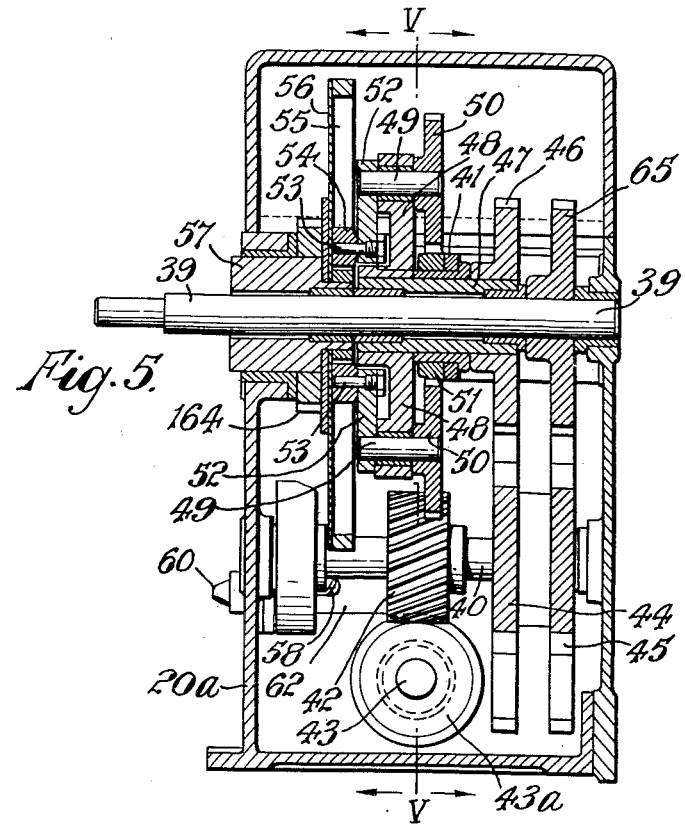
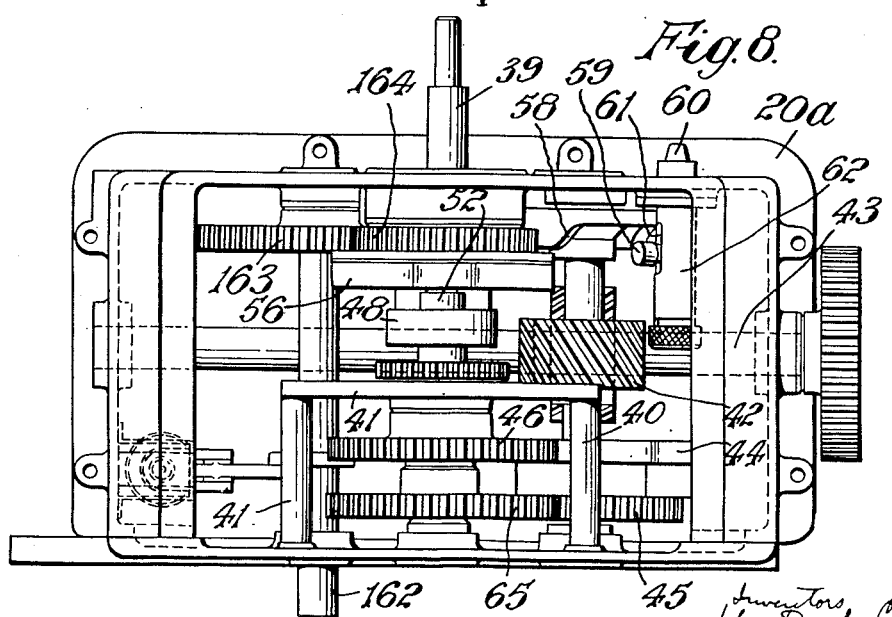

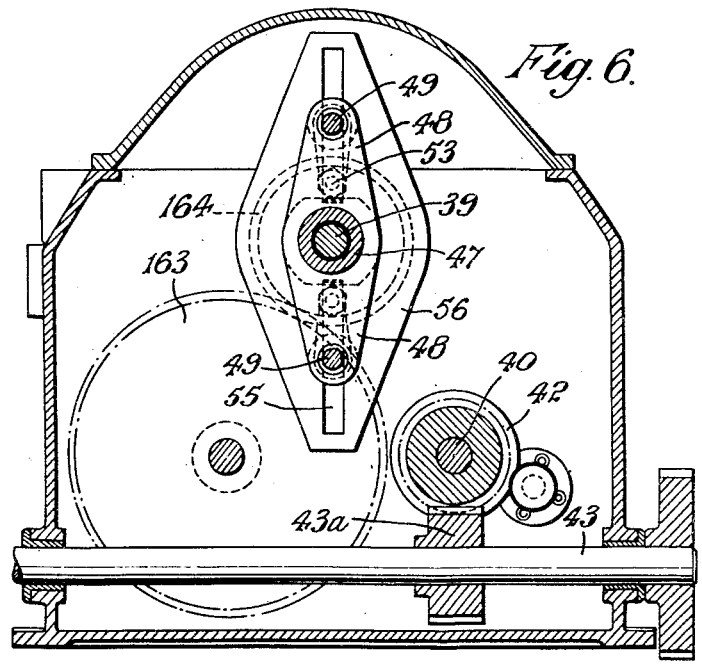
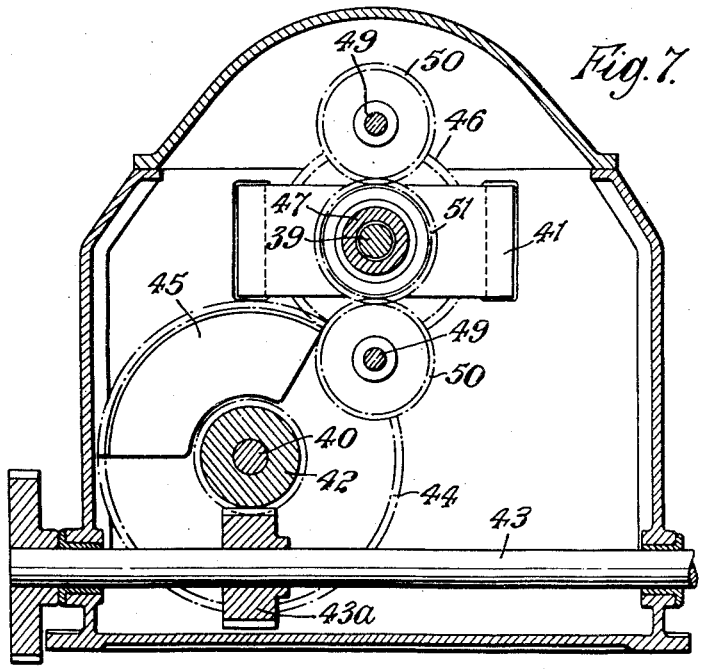

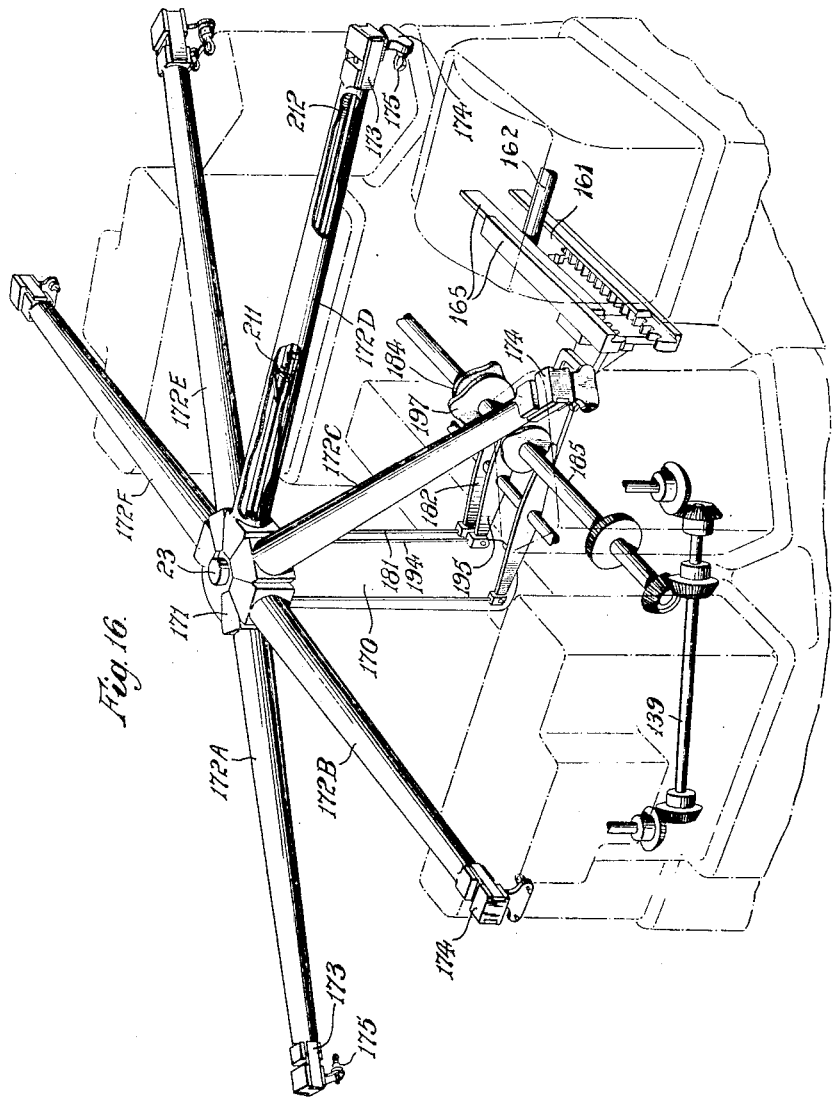

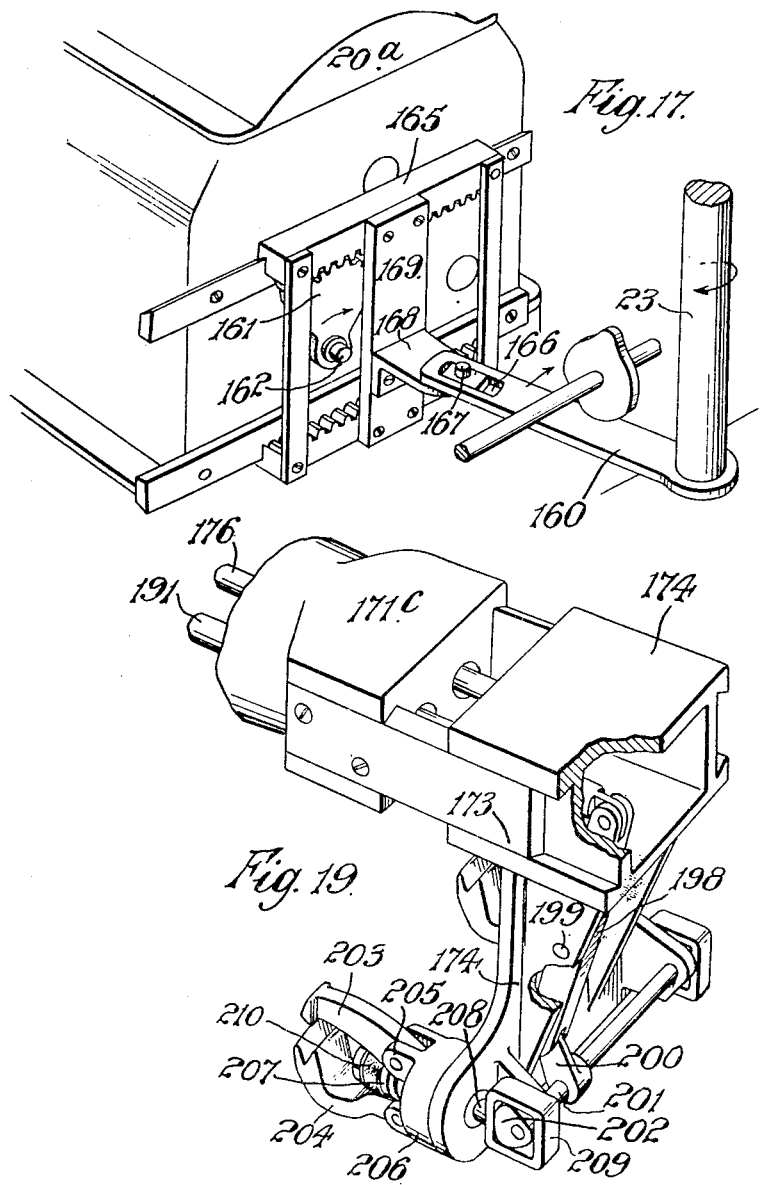

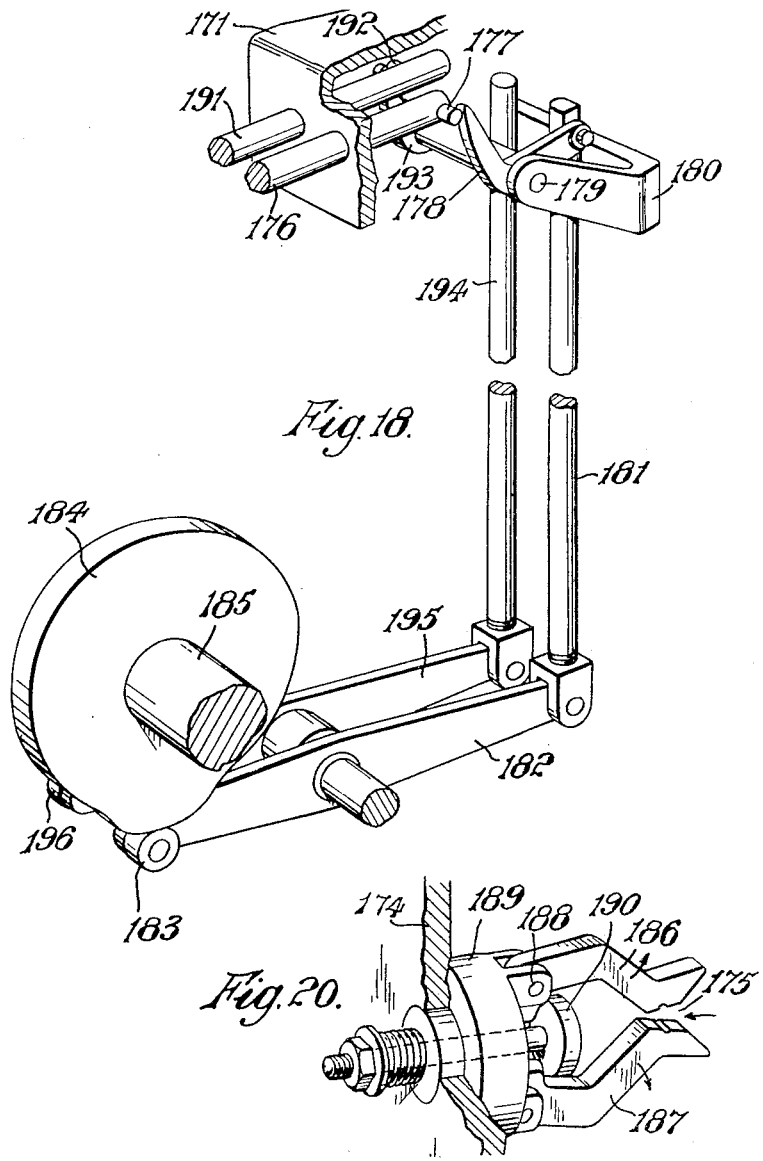

United States Patent Office 2,708,228
Patented May 10, 1955

2,708,228

APPARATUS FOR THE AUTOMATIC PRODUCTION OF ENDLESS LOOP OF WIRE FROM WIRE STOCK

John Douglas Crabbe, Liverpool, and Eric Holroyd, Speke, Liverpool, England, assignors to Dunlop Tire and Rubber Corporation, Erie County, N. Y., a corporation of New York Application September 11, 1952, Serial No. 309,074

11 Claims. (Cl. 219—4)

This invention relates to apparatus for the automatic production of endless loops of wire and more particularly to the production of cycle tire bead wires from wire stock by a series of automatically effected operations.

According to the invention there is provided apparatus for the automatic production of endless loops of wire comprising a loop former rotatable about its axis, releasable clamping means on said loop former for clamping it to a free end of wire stock, means for rotating the loop former with a dwell period between each revolution thereof so as to shape the wire into a loop around the loop former, means for cutting the shaped wire during the dwell period so as to separate the shaped loop from the supply wire, an electric welding unit having clamping conduction-jaws, transfer means for removing the shaped loop from the loop former during its dwell period and subsequently inserting the ends of said shaped loop in end to end abutting relationship in the jaws of the welding unit whereby on application of the welding current said loop ends are united, and means for synchronizing the operation of the transfer means with the operation of the loop former, the cutting and clamping means and the welding unit.

In one construction means are provided for mechanically removing flash from the welded joint and in addition transfer means are provided for removing a welded loop from the welding unit and applying the welded joint to the flash removal means. Means are also provided for synchronizing the operation of the said transfer means with the operation of the flash removal means and the welding unit.

The term "welding unit" or "welding head" is used in this specification to refer to a unit which may be provided merely with welding contactors or to a unit which may in addition have annealing contactors adapted to operate after the welding operation is completed.

The cutting means is preferably mounted with the clamping means on the loop former both means being operated by cams mounted co-axially with the loop former and actuated by the shaft on which the loop former is mounted.

In a preferred form of apparatus in accordance with the invention there are two welding units located one on either side of the rotatable loop former and two flash removal units one adjacent each welding unit and remote from the rotatable loop former, the transfer means for removing and transferring a wire loop from one of these units to another having transfer arms which move alternately and in opposite directions between neighboring units.

A very convenient form of transfer means comprises a rotatable pillar carrying radially projecting arms fitted with sets of gripping fingers. The arms are moved by oscillation of the rotatable pillar alternately and in opposite directions between neighboring units, the sets of gripping fingers on appropriate arms being adapted either to remove a shaped wire loop from the loop former and transfer it to a welding unit, to remove a welded loop from a welding unit and transfer it to a flash removal unit or to remove the finished loop from a flash removal unit to a delivery station.

Rotation of the arm-carrying pillar is preferably effected by means of a double slider rack mechanism the racks of which are engaged and moved alternately by a toothed quadrant driven from the mechanism effecting rotation of the loop former.

The invention will now be described by way of example with reference to a particular embodiment or assembly of units. In this description reference is made to the accompanying drawings wherein—

Fig. 1 is semi-diagrammatic perspective view of the assembly with parts broken away to show interior mechanisms;

Fig. 2 is a front elevation of the loop former with parts broken away to show some of the interior construction;

Fig. 3 is a cross-section on the line II—II of Fig. 2;

Fig. 4 is a fragmentary detail view of clamping means on the loop former;

Fig. 5 is a sectional side elevation of the driving mechanism for the loop former and associated mechanisms;

Fig. 6 is a cross-section on the line V—V of Fig. 5 viewed from the right hand side;

Fig. 7 is a cross-section on the line V—V of Fig. 5 viewed from the left hand side;

Fig. 8 is a plan view of mechanism shown in Fig. 5 with the cover removed;

Fig. 16 is a diagrammatic perspective view of the transfer mechanism;

Fig. 17 is a fragmentary detail perspective view of the traversing means for the transfer mechanism;

Fig. 18 is a fragmentary detail view of the operating mechanism for the fingers of the transfer mechanism;

Fig. 19 is a fragmentary detail view of one form of finger operating mechanism for transferring loops from the loop former to a welding unit;

Fig. 20 is a detail view of a finger mechanism for transferring a welded loop from a welding unit to a flash removal unit.

Figure 9:
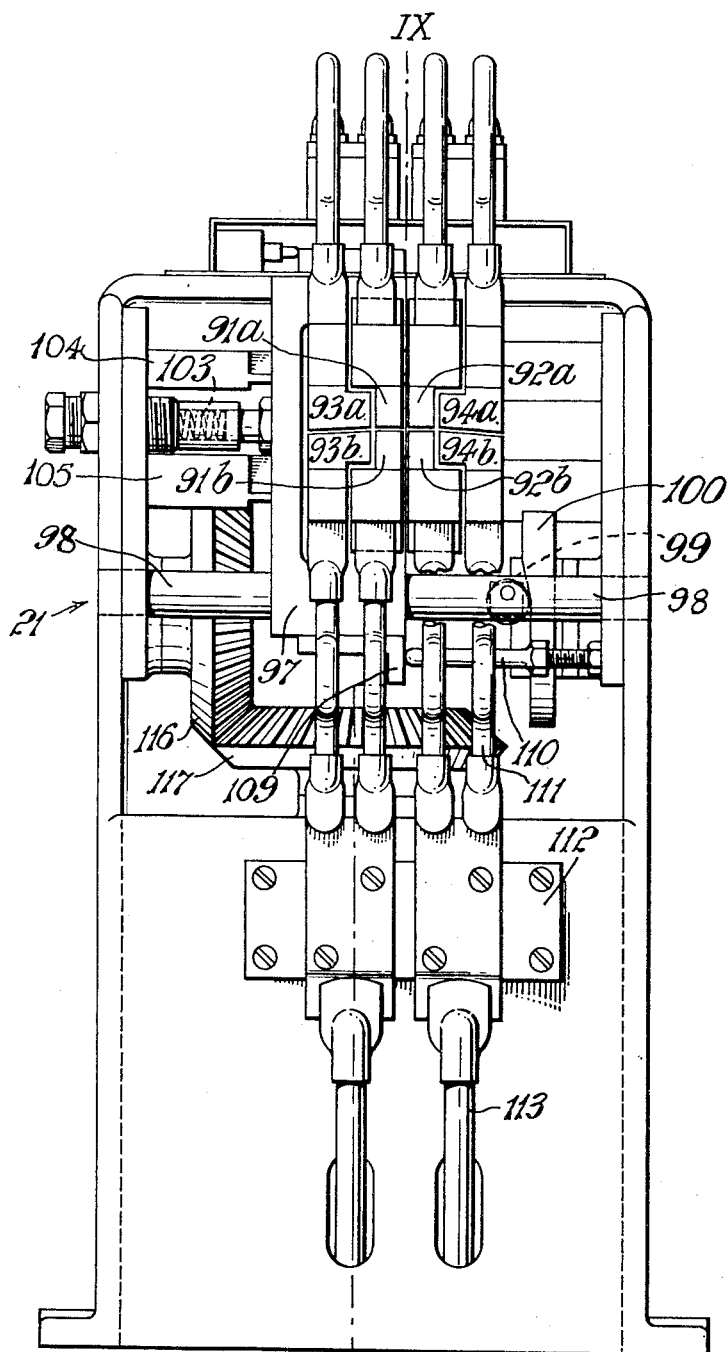
Fig. 9 is a detailed front elevation of the welding and annealing unit.
Figure 10:
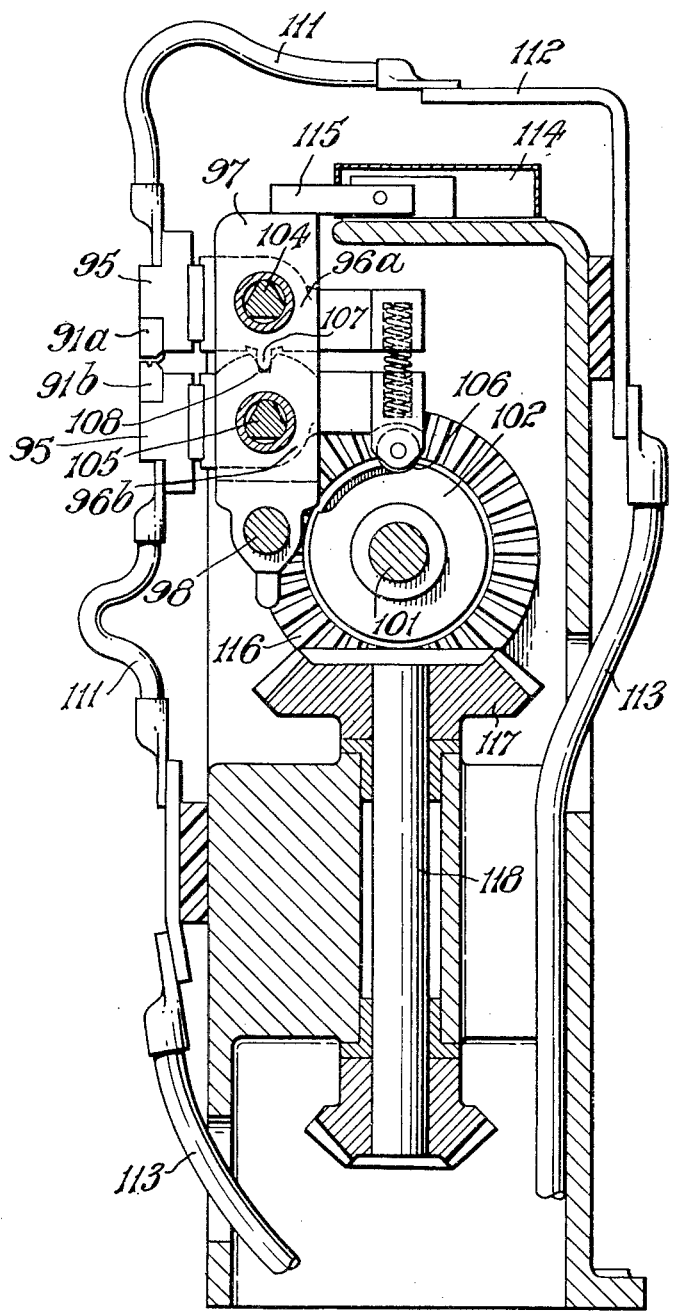
Fig. 10 is a cross-section on the line IX—IX of Fig. 9 viewed from the right hand side.
Figure 11:
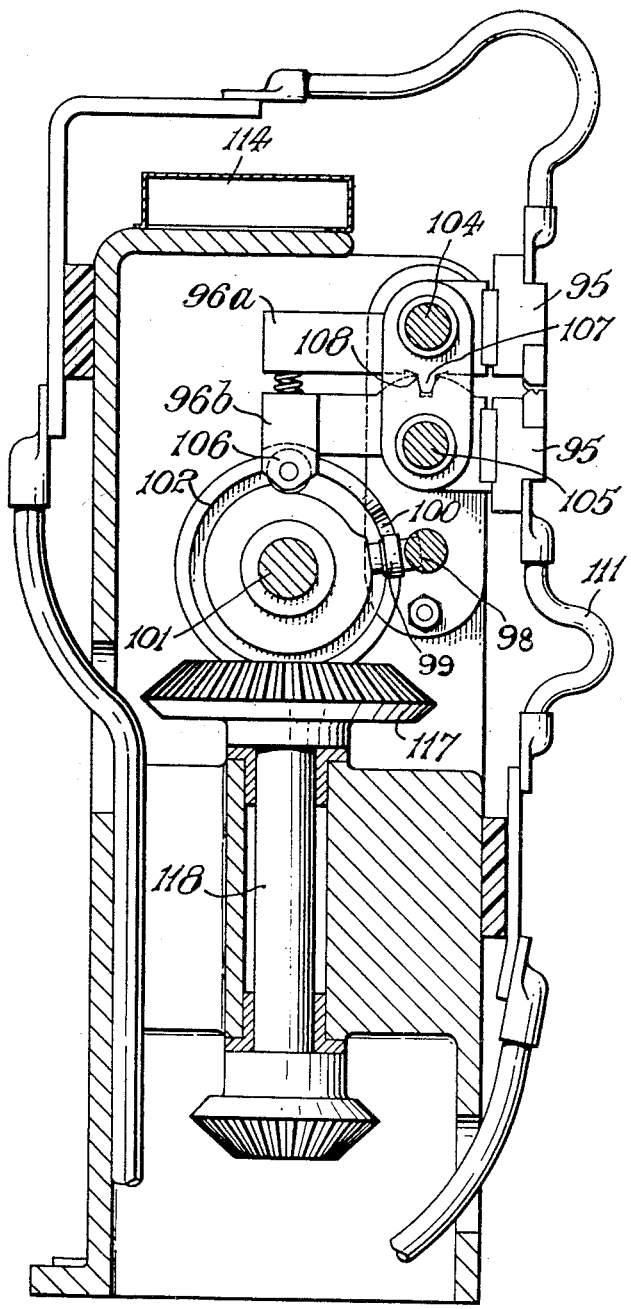
Fig. 11 is a cross-section on the line IX—IX of Fig. 9 viewed from the left hand side.

The assembly shown in Figs. 1 and 2 consists of an approximately semi-circular casting on which is mounted near the mid part of the periphery a loop former unit 20. On each side of the loop former unit is located a welding unit 21 and a flash removal unit 22, these latter being located approximately at the ends of the semi-circle. At the center of the semi-circle is located a rotatable pillar 23 carrying radially extending arms and constituting a transfer means. Suitably disposed in the base casting is a main electric motor for providing the drive to the various units of the assembly. Wire is fed from a supply coil 24 through a feeding nozzle 25, Fig. 2, fixed on the unit adjacent to the top of the loop former unit 20.

Loop forming unit, Figs. 1 to 8

The loop former unit comprises a circular back plate or disc 26 rotatable about its center and carrying three loop forming and supporting segments 27, 28 and 29. Segment 27 has a pair of slots 27ᵃ and is held in position by guide blocks 27ᵇ on the disc 26 which permit it to slide radially with respect to back plate 26. Adjustment of this segment is effected by rotation of lead screw 30 threaded through a boss 31 fixed to the back of segment 27 by means of a pin 31ᵃ, Fig. 3. The lead screw 30 is journalled in brackets 32 secured to the back plate 26. Radial movement of segment 27 effects movement of the loop segments 28 and 29 through a pair of arms 33 which connect one end of each of the loop segments 28 and 29 to the slidable segment 27 the other ends of segments 28 and 29 being permanently pivotally secured to the back plate 26 by the pivots 28ᵃ and 29ᵃ. Adjustment of these segments on which the loop is wound enables exact adjustment of the length of wire loop to be attained. The periphery of the loop former has a slight radial projection 34, Fig. 2, for a purpose to be hereinafter described.

Between the pivots 28ᵃ and 29ᵃ of loop segments 28 and 29 there is fitted to the periphery of the back plate 26, clamping means and guillotine means generally indicated by reference numerals 35 and 36 and shown more particularly in Figs. 2, 3 and 4. The clamping and guillotine means are operated by an edge type cam mechanism 37, Fig. 3, at the rear of the loop former and a multi-purpose cam mechanism 38 at the front of the loop former, both these cam mechanisms being mounted co-axially with the loop former on shaft 39.

The drive for the loop former itself and for the co-axially mounted cams is contained within the casing 20ᵃ. This mechanism, shown in Figs. 5, 6, 7 and 8, consists of shaft 39 and a lower shaft 40 supported in bushings in the walls of casing 20ᵃ. The lower shaft 40 is driven continuously through a helical gear 42, itself driven by helical gear 43ᵃ on the main driving shaft 43 for the loop former. A gear segment 44 and a pinion 45 are keyed to shaft 40, Figs. 5 and 7. The gear segments serve to drive the loop forming plate 26 forwardly a complete revolution and then dwell while the gear 45 drives the shaft 39 carrying cam elements to grip the wire and sever the loop from the wire stock during the dwell period. To this end the gear segment 44 meshes with a pinion 46 fixed on a sleeve 47 freely rotatable on the upper shaft 39; the pitch diameters of the segment 44 are sufficiently larger than that of the gear 46 to give the gear a complete rotation for each rotation of segment 44. This sleeve carries for rotation with it two arms 48 having crank shafts 49 in their extremities. At one end of each crank shaft is fixed a pinion 50 which meshes with a fixed pinion 51 secured to a fixed U-shaped bracket 41. The other end of each crank shaft 49 has a crank arm 52 rigidly and non-rotatably attached thereto and the extremities of these arms carry crank pins 53 on which are freely mounted bronze slippers 54 adapted to slide in radial slots 55 in a rotatable member 56 connected to a boss 57 on the upper shaft 39. Thus as the arms 48 rotate the crank arms 52 are rotated by the planetary motion of the pinions 50 around the fixed pinion 51 and these crank shaft arms move the bronze slippers 54 in the slot 55 so that harmonic oscillating motion is imparted to the rotatable member 56 and boss on which it is mounted and thence to the plate 26.

A cam 58, Figs. 5 and 8, on the lower shaft 40 is adapted to engage roller abutment 59, projecting radially from spring-loaded locking pin 60 and is able to slide in slot 61 of the locking pin housing 62. The locking pin when urged forward by its spring so as to engage a socket (not shown) in the back plate 26 of the loop former prevents rotation of the latter when gear segment 44 and pinion 46 are out of mesh.

Pinion 45 on lower shaft 40 meshes with a cam driving pinion 65 keyed to the upper shaft 39. Rotation of the upper shaft 39 gives a constant speed of rotation to the cam mechanisms 37, 38, which operate the clamping and guillotine means 35 and 36 to cut the wire when a loop has been completed. The ends of the loop are gripped and held by the transfer mechanism described below before being severed from the wire stock supplied to the loop former. Cam mechanism 38, see Figs. 2 and 3, at the front of the loop former is a multi-purpose cam having inner and outer tracks 66 and 67 cut in its rear face and an edge cam surface indicated by reference numeral 68 at its front face. Cam 37, Fig. 3, at the rear of the loop former 20ᵇ is also an edge type cam.

The guillotine 36 consists of a shearing block 70 fixed to the loop former back plate 26 and a blade 71 pivotally and reciprocably mounted with relation to the block (see Figs. 2 and 3). The clamping means 35, Fig. 4, consists of a spring-loaded hook shaped gripper 72 pivotally mounted so as to swing to and away from the periphery of the loop former and also mounted for slight radial movement with respect to the loop former.

Roller 73 on the inside track 66 of the multi-purpose cam 38 lifts a guided push rod 74 which in operation lifts the guillotine blade 71 to position it for cutting and also lifts a guillotine operating push rod 75. The edge cam surface 68 is engaged by a roller 76 operating spring-loaded lever mechanism 77. This lever mechanism operates the push rod 75 so as to sweep the blade 71 over the edge of the loop former and shear the wire between the blade 71 and the shearing block 70. A roller 78, Fig. 2, in the outer track 67 operates a further push rod 79 immediately after the guillotine has acted and gives it an upward movement. Pivotally mounted on a pivot pin 79ᵈ on the upper end of push rod 79 is a carrier 79ᵃ for the clamping gripper 72, Fig. 4. The carrier 79ᵃ is anchored by a link 79ᵇ to a rod 79ᶜ in a fixed bracket 80. A spring 81 is interposed between the bracket 80 and a collar 81ᵃ on the rod 79ᶜ.

In action when the push rod 79 rises it first lifts the clamping gripper 72 vertically clear of the wire loop after which the collar 81ᵃ having come up against the bracket 81ᵇ an angular movement is imparted through link 79ᵇ to swing the gripper 72 about the pivot 79ᵈ and clear of the wire. This enables the shaped loop to be withdrawn by the transfer mechanism to be described and when this has taken place a push rod 82 actuated by cam 37 operates a sliding bolt-like member 83 with a cut-away portion 84 at its forward end so that it projects under the wire. A pivoted tilting plate 85 with slot 86 which engages the bolt-like member 83 operatively connects the latter to the push rod 82 which engages the underside of the tilting part. This mechanism acts to position a loose end of the wire stock underneath the clamping device which subsequently moves back to clamp the wire to the loop former.

When the formed loop is cut the loose end of the wire stock springs back slightly and accordingly in order correctly to position the cut end of the stock and to counteract the slight loss of length which would otherwise occur with the next loop formed, the stock is temporarily deflected over radial projection 34 on the back plate 26. This is effected by temporary displacement of the feeding nozzle 25, Fig. 2, this displacement being obtained by operation of cam 87 acting on lever 87ᵃ connected to the nozzle 25 at position 87ᵇ. Cam 87 is fixed on main drive shaft 43. At the same time this displacement of the wire stock acts to leave a clearance between the two parallel lengths of wire at the cutting and clamping position. The nozzle 25 has spring controlled jaws (not illustrated) which, after the manner of a chuck, allow the wire to be fed forward but grip it to prevent it springing back.

Welding units, Figs. 9 to 12

Each of the two welding units 21 consists of a pillar-like casing in which is mounted a welding and annealing head. This head, see Figs. 9, 10 and 11, consists of left hand, upper and lower conductor welding electrodes 91ᵃ and 91$^b$, right hand, upper and lower conductor welding electrodes 92$^a$ and 92$^b$ and left hand, upper and lower annealing electrodes 93$^a$ and 93$^b$, and right hand, upper and lower annealing electrodes 94$^a$ and 94$^b$. Each of the electrodes is mounted in an electrode holder 95 carried by fingers 96$^a$ and 96$^b$. The left hand electrodes 91$^a$ and 91$^b$ and 93$^a$, 93$^b$ are contained as a unit in a box-like structure 97 slidable on guide shafts 104, 105, to which left hand electrode assembly is secured a push rod 98 having a roller follower 99, Figs. 9 and 11, which engages with cam 100 mounted on shaft 101 which also carries cams 102 for effecting pivotal movement of the fingers 96$^a$ and 96$^b$ for the opening and closing of the electrodes. A compression spring 103, Fig. 9, on the left hand side of the electrode assembly 97 urges the latter toward the right hand electrodes against the action of the cam 100. The fingers 96$^a$ and 96$^b$ are separately and pivotally mounted on the shafts 104, 105 and carry roller followers 106 which engage the cams 102. Fingers 96$^a$ carrying the upper electrodes have a single tooth 107 which engage a groove 108 in the fingers 96$^b$ carrying the lower electrodes. The portion of shafts 104, 105 on which the left hand box-like structure 97 slides is triangular in section to facilitate such sliding movement. Stop plate 109 and pin 110 are provided for limiting movement of the left hand electrode assembly 97. The electrode holders 95 for each of the welding or annealing electrodes are connected by flexible cables 111 to bus bars 112 which are themselves connected to cables 113 leading to a transformer in the base of the pillar-like casing. An arm 115 secured to the top of the assembly 97 is adapted to engage a microswitch 114 fitted to the top of the casing and operates this switch on inward movement of the assembly 97 which follows the formation of the weld as will be later described.

The cam shaft 101 for operating the fingers 96$^a$, 96$^b$ and the inward movement of the left hand electrode assembly 97 is driven through a bevel wheel 116 meshing with a bevel wheel 117 on a shaft 118 driven from the main drive.

Figure 12:
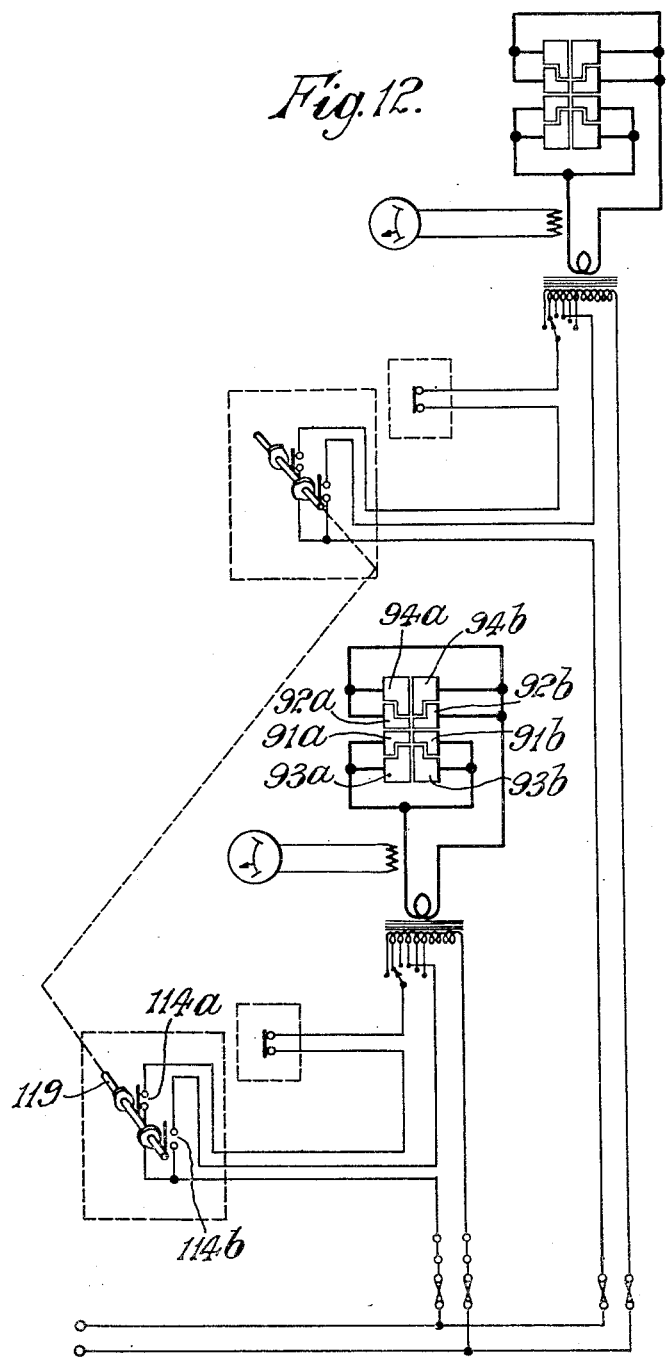
Fig. 12 is a diagram of the main electrical connections for the welding and annealing circuit.

Automatic switching and timing of the welding and annealing operations is controlled by the cams on a shaft 119, Fig. 12, which shows the wiring diagram for both welding units, and shaft 119 operates a welding microswitch 114$^a$ and an annealing microswitch 114$^b$ in the primary circuit of the welding transformer. Microswitch 114$^a$ closes a circuit through all of the turns of the primary of the welding transformer to give a large welding current while switch 114$^b$ closes a switch through a part only of the primary turns to give a smaller current.

Figure 13:
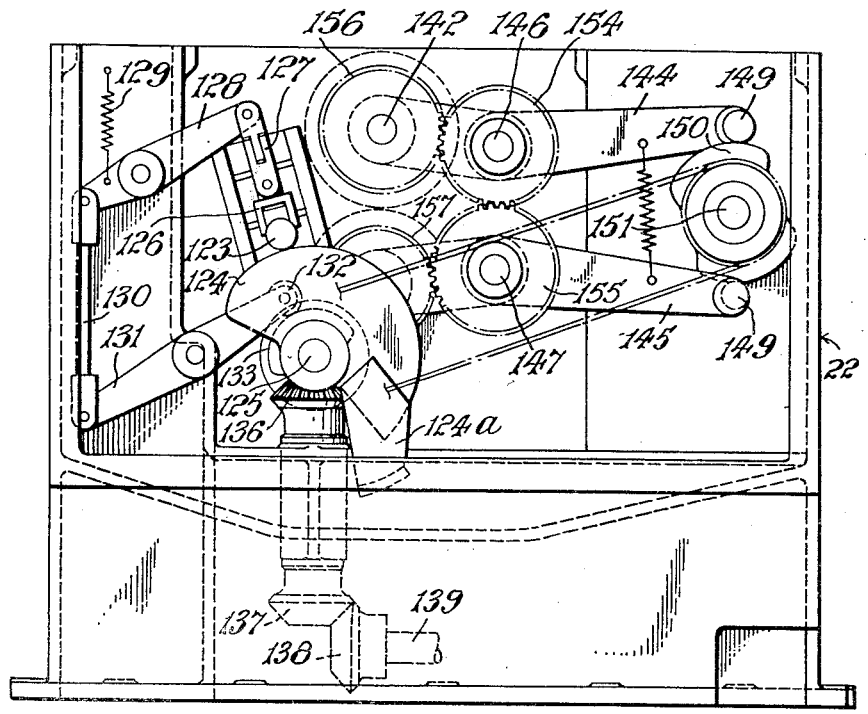
Fig. 13 is a front elevation of a flash removal head with the front cover of the casing removed.
Figure 14:
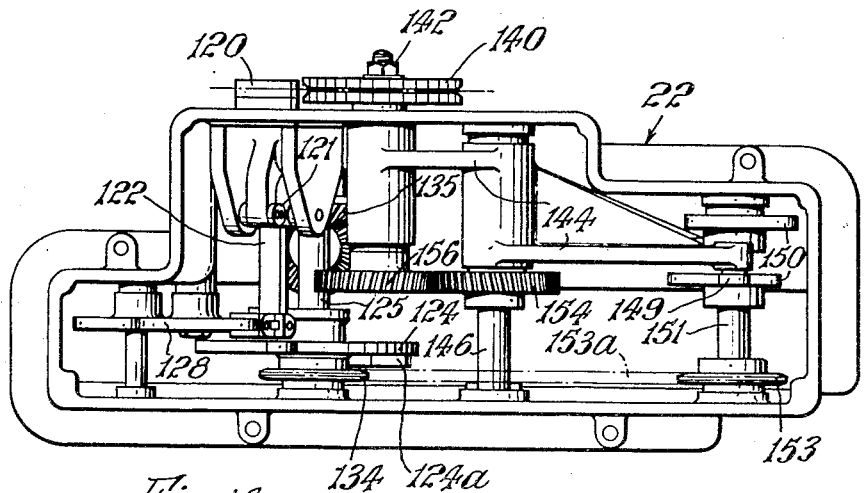
Fig. 14 is a plan view of Fig. 13.
Figure 15:
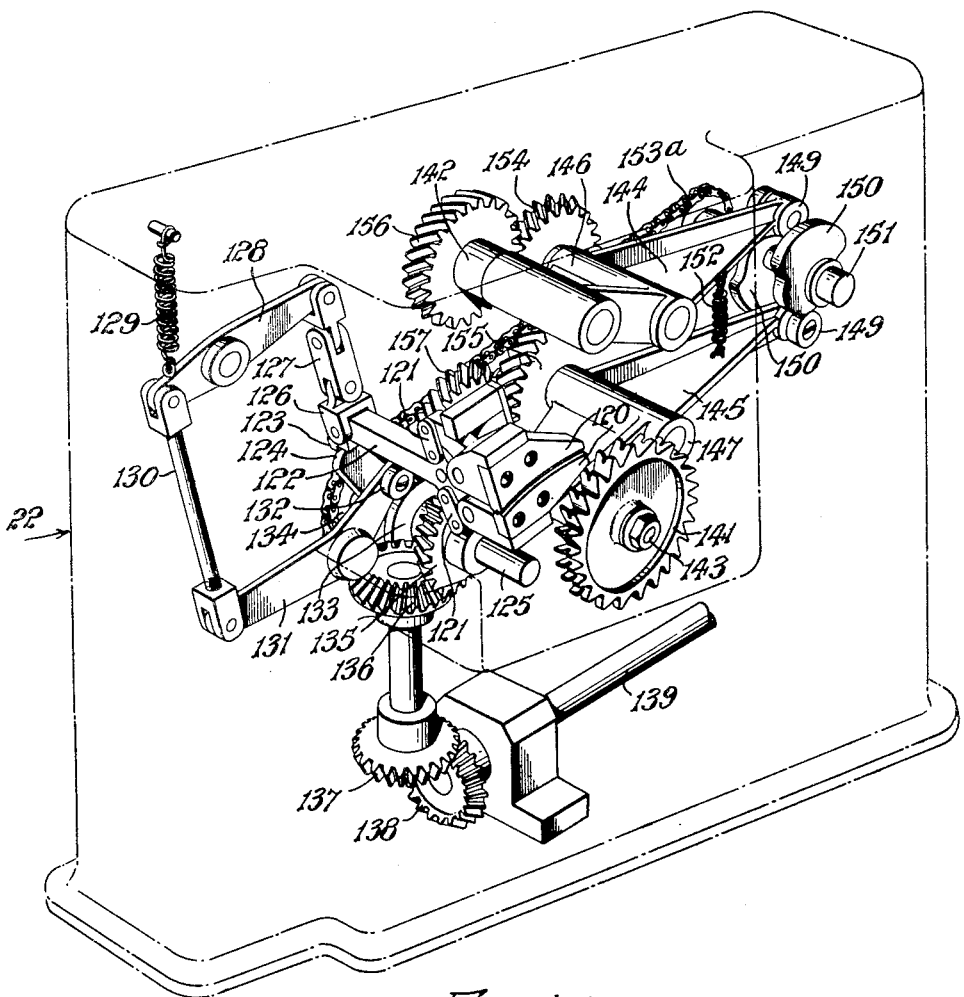
Fig. 15 is an isometric view of the flash removal head which is mounted on the other side of the loop former to the flash removal head illustrated in Figs. 13 and 14.

*Flash removing units, Figs. 13, 14, and 15*

Each flash removal head, Figs. 13–15, indicated generally by reference numeral 22 has a pair of receiving jaws 120 and an associated cam-operated toggle mechanism to ensure a firm grip of the welded wire loop. The toggle mechanism consists of links 121 connecting the pivoted gripping jaws to a toggle lever 122 which has at its other end a roller follower 123 engaging a cam 124 adapted to provide a final squeezing movement to the gripping jaws, said cam being mounted on cam shaft 125. Cam 124 is also fitted with a cam follower return plate 124$^a$. The remote end of the toggle lever is also connected by a fork 126 and link 127 to a pivoted arm 128, this arm being anchored by a tension spring 129 to the casing of the flash removal head and also connected by link 130 to one arm of a lever 131 the other arm of which carries a roller follower 132, which bears against the main closing cam 133 on the cam shaft 125. On the rear end of this cam shaft 125 there is fitted a driving sprocket 135, the shaft 125 being driven through bevel gear 135 itself driven through bevel gears 137, 138, the latter being driven from oblique shaft 139 driven through the welding head 21 from the main drive.

Adjacent the gripping jaws 120 are two toothed milling cutters 140, 141, Fig. 1, which are fixed to spindles 142, 143, free to revolve in the ends of a pair of cranked arms 144, 145. These arms are pivotally mounted on spindles 146, 147, the lower spindle 146 being free to revolve and driven by a small geared motor 148, Fig. 1. Roller followers 149 at the ends of these arms bear against cams 150 on a cam shaft 151. Spring 152 connected between the arms 144, 145, keeps the followers 149 in contact with the cams 150. Cam shaft 151 carries a sprocket wheel 153 connected by chain 153$^a$ to the sprocket wheel 134 on cam shaft 125. Meshing gears 154, 155, are keyed to spindles 146, 147, and these gears in turn mesh with gears 156 and 157 fixed to spindles 142 and 143.

*Transfer mechanism*

The transfer mechanism, Figs. 16–20, for transferring the cut shaped loop from the loop former to the welding units then to the flash removal units and to a final disposed position consists of the centrally disposed rotatable pillar 23 attached by lever 160, Fig. 17, to a rack and pinion mechanism fitted at the rear of the loop former casing 20$^a$. The rack and pinion mechanism consists of a toothed quadrant 161 driven from shaft 162 which is journalled in casing 20$^a$ and a combined rack and slider 165. The shaft 162 is in turn driven from shaft 39 of the loop former, with harmonic motion by the loop former mechanism through gears 163 and 164, Fig. 6, the latter being secured on the boss 57. As the gear diameter of gear 163 is twice that of gear 164, it and shaft 162 will make a half revolution for every complete revolution of gear 164 and of the loop former. Lever 160 is slotted at 166 and engages a pin 167 of the bracket 168 on a cross-head 169 connecting the upper and lower parts of the combined rack and slider 165.

The central rotating pillar 23 is located in a stationary casing 170 and carries at its upper part for rotation with it a hub 171. Projecting radially from the hub are six loop transfer arms 172 (A–F). Slidably supported in guides 173 at the end of each arm is a carrier plate 174. These carrier plates support a pair of loop gripping fingers 175. Movement of the carrier plates in their slides toward and away from the center pillar, and thereby toward and away from the loops to be transferred, is effected by means of a push rod 176 the inner end of which projects into the hub 171 and is provided with a pin 177, Fig. 18. This pin is positioned to be engaged by a bellcrank lever 178 supported on a pivot 179 by a bracket 180 secured to the stationary central housing 170. The bell-crank lever 178 is connected by a connecting rod 181 to a rocking lever 182 provided with a cam follower 183. This cam follower engages a cam 184 on a cam shaft 185. A compression spring 212, Fig. 16, is provided in the arm 172 to act on the rod 176 for effecting return movement of the rod 176.

The gripping fingers 175 in the two outer pairs of radial arms are shown in detail in Fig. 20 and comprise two fingers, 186 and 187, pivoted at 188 to a collar 189 fixed to the carrier plate 174. A spring-loaded plunger 190 acts on the fingers so as normally to urge them one toward the other and into the gripping position.

Opening and closing movement of the gripping fingers for the centermost pair of arms 172$^c$ and 172$^b$ is effected mechanically. For this purpose, Fig. 18, a further push rod 191 is housed in these arms and the inner end of this push rod, which is located in the hub, is provided with a pin 192 adapted to be engaged by a bell-crank lever 193 operatively connected by a connecting rod 194 to a rocking lever 195. The rocking lever 195 carries a cam follower 196 which engages a cam 197, Fig. 16, on the cam shaft 185. The outer end of the push rod 191 is connected to a lever 198, Fig. 19, pivoted at 199 and connected in turn to a lever 200 secured on a cam shaft 201. Mounted on the ends of this cam shaft are cams 202 which operate respectively the gripping fingers of each pair. Each set of gripping fingers comprises two fingers 203 and 204 pivoted at 205 to a collar 206 secured to the carrier plate 174. The fingers have parts, not shown, which engage a grooved collar 207 on a push rod 208. This push rod carries at its extremity a box-shaped follower 209 in which the cam 202 works. A rubber buffer 210 is located on the end of the push rod 208. Thus as the lever 198 is moved by the push rod 191 angular movement will be imparted to the cams 202, which, through the straps 209 and push rods 208, will impart opening and closing movement of the fingers. An over center spring device 211 may be provided, Fig. 16, for effecting a snap opening and closing movement of the fingers 203 and 204.

The cam shaft 185 carries the cams 184 and 197 for all the arms.

It will be appreciated that the connecting rod mechanism 181 and 194 (where employed) remains stationary whilst the hub 171 and push rods 176 and 191 rotate. The pins on the ends of the push rods will therefore be presented at different times to different pairs of the operating cranks 178 and 193.

The arrangement is such that the levers 178 and 193 are clear of the pins 177 and 192 when the hub 171 and its associated mechanisms are rotated.

*Operation mechanism*

The operation of the complete machine as above described will now be dealt with in detail. It will be understood that whilst the machine is working there will be intermittent periods of operation of the loop former 20, welding heads 21, and flash removal heads 22 with co-related intermittent operation of the transfer mechanism. During dwell periods between these intermittent operations, the transfer fingers 175 engage and carry a loop into or out of the welding heads and flash removers.

Initially the free end of the wire stock is clamped to the loop former 20 by the clamping means 35 and the machine is set in operation so that the first loop is shaped. Assuming that the loop transfer arms 172 are in the position shown in Fig. 16 of the drawings, during shaping of the first loop, the loop transfer arms move in anti-clockwise direction (looking down on the machine) so that when the loop former ceases to rotate on completion of the shaping of the first loop the fingers 175 on the arm 172$^C$ are opposite the loop former. These fingers now move in and grip the loop. During this dwell period the cam mechanism 38 on the loop former acts first to lift the guillotine blade 71 and then to cut the wire, following which, the clamping means 35 is moved away from the loop thus releasing the formed loop which is now removed from the loop former by the fingers on the arm 172$^C$. During this dwell period the free end of the wire stock is clamped to the loop former.

The former now rotates to shape a second loop. During this operation the transfer arms 172 move in a clockwise direction and the first formed wire loop is taken by the arm 172$^C$ to the left hand welder and, during the next dwell period of the arms is deposited in the jaws of the welder. Also during this second dwell period the second former loop is picked up by the fingers on the arm 172$^D$. The loop former now rotates to form the third loop. During formation of the third loop the transfer arms 172 move in the anti-clockwise direction so that the second formed loop is being taken to the right hand welder whilst at the same time the first formed loop is being welded. During the welding operation the butt ends of the shaped loop fuse together and form a butt joint at the same time giving rise to a flash. This consequent shortening of the wire causes an inward movement of the left hand welding jaw assembly 97, under the action of the spring 103, which movement causes the arm 115 to operate the microswitch 114 so as to switch off the welding current. The welding jaws are then operated by cams 102 and subsequently the annealing current is switched on through the switch 114$^b$.

During the last described welding operation the second formed loop has, as stated, been taken by the arm 172$^D$ to the right hand welding head whilst arm 172$^C$ has returned from the left hand welder position to one in front of the loop former.

The loop former now rotates again to form the fourth loop during which time the third loop is transferred by clockwise movement of the transfer arms to the left hand welding head, the first formed and now welded loop being simultaneously carried by the arm 172$^B$ to the left hand flash remover. At the same time the second formed loop is being welded in the right hand welding head.

During the next rotation of the loop former to form the fifth loop the transfer arms rotate in the anti-clockwise direction so as to transfer the fourth formed loop by arm 172$^D$ to the right hand welding head and arm 172$^C$ returns to the position in front of the loop former. During this rotation of the loop former to form the fifth loop the third loop is welded and the second formed loop is taken to the right hand flash removal head by the arm 172$^E$ whilst the left hand flash remover operates to remove the flash from the first formed and welded loop. In operation jaws 120 of the flash remover receive the welded loop and close on it to hold it firmly in position, the jaws first moving in quickly under the action of the cam 133 and then slowly and with greater force under the action of cam 124 so as to obtain a final firm hold on the loop. At the same time the milling cutters 140, 141 rotating at constant speed move quickly towards the wire loop under the action of the cams 150 and on engagement with the wire, cut away the flash. On completion of the flash removing operation the cutters move quickly apart.

After the appropriate dwell period during which the previously formed loops are engaged by the fingers on the appropriate arms, the loop former again rotates to form the sixth loop. During formation of this loop the transfer arms rotate in a clockwise direction so that the fifth formed loop is transferred to the left hand welder whilst the fourth formed loop is being welded. The third loop is brought to the left hand flash remover, the second formed loop having its flash removed in the right hand flash remover, the first formed and welded loop with flash removed is taken by arm 172$^A$ to a delivery station to the left and rear of the base casting where the finished loop is removed from the gripping fingers.

During the next rotation of the loop former, after the appropriate dwell period the seventh loop is formed and the transfer arms are simultaneously rotated in the anti-clockwise direction so that arm 172$^D$ transfers the sixth formed loop to the right hand welding head. During this period the fifth formed loop is being welded whilst the fourth formed loop is simultaneously transferred by arm 172$^E$ to the right hand flash remover, the third formed loop is having its flash removed at the left hand flash remover head and at the same time the second formed loop is being taken to a right hand delivery station by arm 172$^F$.

The above sequence of operations continues whilst the machine is working, finished loops being delivered alternately to the left and right hand delivery stations by the arms 172$^A$ and 172$^F$ respectively.

Having described our invention, what we claim is:

1. Transfer means for transferring loops of wire from a loop forming machine to a welding machine which comprises an upright supporting pillar, an arm extending radially from said pillar to swing between said loop forming machine and said welding machine, a pair of gripping fingers at the outer end of said arm, a carrier for said fingers, a rod to move said carrier and fingers toward and from the welding machine and loop former respectively and a cam rotated in synchronism with said pillar to actuate said rod.

2. The transfer means of claim 1 having a push rod movable to open and close said fingers, a rocking cam to actuate said push rod, a rotating cam driven in synchronism with the pillar and a linkage through said arm from said rotating cam to said rocking cam to rock said rocking cam and close said fingers periodically at each movement of said pillar.

3. The transfer means of claim 1 in which said fingers are spring pressed to closed position.

4. Transfer mechanism for transferring loops of wire alternatively from a central loop forming station to stations one on each side of said central loop forming station which comprises a pillar situated centrally of said three stations and having a pair of arms journaled on the axis of said pillar and extending radially from said pillar to said stations and spaced angularly to extend to two adjacent stations, each of said arms having sets of gripping fingers to engage a loop at said loop former and release it at an adjacent station, a transmission between said loop former and said pillar comprising a shaft geared at half angular speed to said loop former and a reversing device to reverse the rotation of said pillar at each rotation of said loop former.

5. The transfer mechanism of claim 4 in which said transmission rotates said pillar through an angle equal to that between said arms at each reversed movement.

6. The apparatus of claim 11 in which said transfer machine comprises an upright pillar having a loop carrying arm extending radially from said pillar to oscillate between said grip and said welding machine.

7. Apparatus for forming endless welded wire loops from wire stock which comprises loop forming mechanism having supporting elements to provide a circular supporting surface, a grip to engage an end of said wire stock and draw it about said circular surface to form a loop and a shear to sever said loop from said wire stock, a pair of welding machines one on each side of said loop forming mechanism, each welding machine having a pair of gripping electrodes to hold the ends of a loop in abutting end-to-end position for welding, a transfer means having a pair of loop carrying elements one between said loop forming mechanism and one of said welding machines and movable alternately between said loop forming mechanism and its respective welding machine, and a common drive for rotating said grip at intervals and for severing said loop and moving said transfer means between said intervals.

8. The apparatus of claim 7 in which said transfer mechanism comprises a pillar and loop carrying arms extending radially from said pillar in fixed angular position and oscillatable as a unit about the axis of said pillar to swing said arms alternately from said loop forming mechanism to its respective welding machine.

9. The apparatus of claim 7 having a pair of flash removing means one for each welding machine and spaced from the side of its respective welding machine opposite said loop forming mechanism and a second pair of transfer means to transfer welded loops from one welding machine to its respective flash removing means, said flash removing means and said second transfer means being driven from said common drive.

10. The apparatus of claim 9 in which said loop forming mechanism, said welding machines and said flash removing means are arranged on an arc and in which said transfer means comprises a supporting pillar at the center of said arc and radial arms at relatively fixed angular positions rotatably mounted on said pillar and having loop carrying elements.

11. Apparatus for automatically forming endless loops of wire from wire stock which comprises a loop forming machine having loop supporting surfaces in circular formation about a center, a grip to grip an end of wire stock and mounted to rotate at successive intervals about said center to form a loop on said loop supporting surfaces and a shear to sever the formed loop from the wire stock between said intervals of rotation, an electric welding machine spaced from and operable independently of said loop forming machine and having electrodes to grip the ends of said wire loop in abutting position for welding, a transfer machine between said loop forming machine and said welding machine having gripping fingers to grip the ends of a loop formed on said supporting surfaces prior to severing and movable to said electrodes of said welding machine to deliver said gripped ends to said electrodes and then release them, and a common drive to rotate the grip of said loop forming machine and move said gripping fingers between said loop forming machine and said welding machine in timed sequence.

References Cited in the file of this patent

UNITED STATES PATENTS

| | | |
|---|---|---|
| 705,130 | Perry | July 22, 1902 |
| 746,442 | Bates | Dec. 8, 1903 |
| 2,015,184 | Hopkins | Sept. 24, 1935 |